June 9, 1953  D. E. WILCOX  2,641,088

WORM GEAR LAPPING APPARATUS

Filed Sept. 26, 1949

INVENTOR.
DOYLE E. WILCOX

BY William R. Lane

ATTORNEY

Patented June 9, 1953

2,641,088

UNITED STATES PATENT OFFICE 2,641,088

WORM GEAR LAPPING APPARATUS

Doyle E. Wilcox, Inglewood, Calif., assignor to North American Aviation, Inc.

Application September 26, 1949, Serial No. 117,752

9 Claims. (Cl. 51—26)

This invention pertains to the lapping and checking of worm gears and particularly to apparatus for lapping and checking worm and gear combinations to extreme accuracy.

It is an object of this invention to provide an apparatus for lapping the mating surfaces of a worm and gear to increase the accuracy thereof.

It is a further object of this invention to provide apparatus for producing highly accurate worms and gears.

It is a further object of this invention to provide a device for checking the accuracy of worm and gear combinations throughout the entire gear.

Other objects of invention will become apparent from the following description taken in connection with the accompanying drawings in which.

Figure 1:
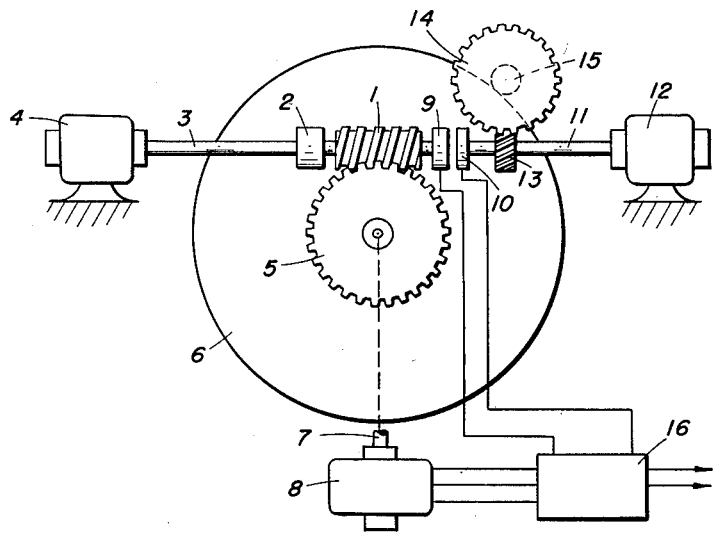
Fig. 1 is a schematic diagram of the invention.

Referring to Fig. 1, worm 1 is supported in a thrust bearing 2 on a shaft 3 driven by a constant speed motor 4. Worm 1 engages worm gear 5 integrally secured to precision ground friction drum 6, shaft 7 and torque motor 8. Shaft 3 supports element 9 of an angular error pickoff, while element 10 of the pickoff is attached to shaft 11 turned by motor 12. Helical gear 13 turns with shaft 11 and engages helical gear 14 having a precision ground friction roller 15 integral therewith, arranged to engage friction drum 6. Signals from pickoff elements 9 and 10 are amplified in amplifier 16 and are used to control power furnished to torque motor 8.

Figure 2:
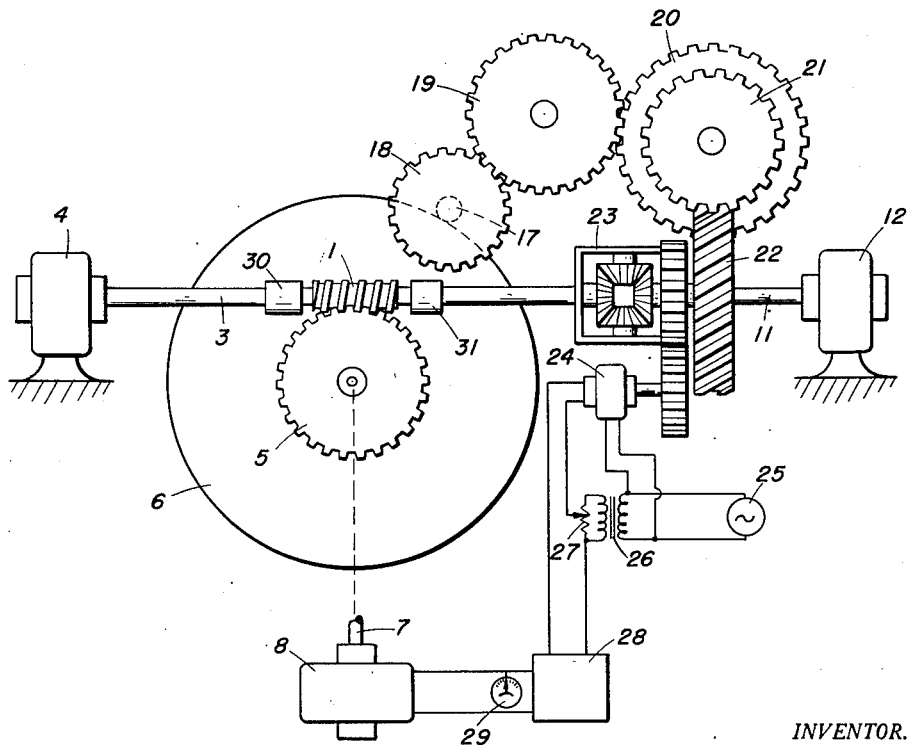
Fig. 2 is a schematic diagram illustrating a second somewhat modified embodiment of the invention.

The device shown in Fig. 2 differs principally from that shown in Fig. 1 in the manner of detecting errors between the precision drum and roller drive, and the worm and gear drive. Roller 17 is attached to gear 18 which engages gear 19, which in turn engages gear 20. Gear 20 is attached to helical gear 21 which turns helical gear 22 connected as in Fig. 1 to motor 12 by a shaft 11. Shaft 11 and shaft 3 supply rotations to differential 23. Differential 23 algebraically adds the rotations of shafts 3 and 11, which are geared to rotate in opposite directions, and the sum rotation is detected by electromagnetic A. C. detector 24 which receives alternating current from an alternating current source 25 and furnishes a signal via transformer 26 and bias adjustment resistor 27 to servo amplifier 28 which drives motor 8 and error meter 29.

Referring to Fig. 1, gears 1 and 5 which are to be lapped to great accuracy are placed in the engaging relationship shown, and drive motor 4 drives gear 1 at a constant angular velocity. Gear 5 engaging worm gear 1 drives roller 15 through drum 6, and this motion is transmitted through helical gears 13 and 14 to shaft 11 which is also driven by motor 12. Motor 12 furnishes to shaft 11 only such torque as is required to overcome the friction present in helical gears 13 and 14 and their associated shaft bearings. There is therefore very little actual load carried by drum 6 and roller 15.

Pickoff elements 9 and 10 generate an error signal proportional to the angular deviation between shaft 3 and shaft 11. This error signal is amplified and is used to control the power supplied to torque motor 8 which supplies a resisting torque opposed to the torque applied to gear 5 by gear 1. Lapping compound is applied to the gears, and therefore the worm gear is automatically lapped by an amount proportional to that required to attain the same accuracy in the gear as is attained by the precision drum and roller arrangement. In other words, the pressure applied to the engaging teeth of worm 1 and worm gear 5 is always proportional to the error between the rotation supplied through the gears 1 and 5 and the rotation supplied through the precision drum and roller.

Once assembled, the device is automatic in operation and the final result is that the worm and gear combination is lapped to the same angular accuracy throughout one full revolution of the worm gear as is attained by the precision friction roller and drum. Error signal amplifier 16 incorporates a three-phase controller of conventional type for controlling the power supplied to three-phase torque motor 8. Pickoff elements 9 and 10 may be of the electromagnetic, electrostatic or photoelectric type so long as the signal developed by the pickoff combination is proportional to the error between shaft 3 and shaft 11.

Referring now to Fig. 2, thrust bearings 30 and 31 are provided to position worm gear 1 accurately. Roller 17 cooperates with drum 6 in the same manner as disclosed in connection with Fig. 1, and gears 18, 19, 20, 21 and 22 are provided so that different worm ratios may be accommodated by the device and so that differential 23 may be employed to produce the error signal for controlling the torque of motor 8. Gear 19 is removable and is an adjustable idler gear provided for the purpose of matching whatever gear ratio is present in the particular worm and gear which is being checked or lapped. Differential 23 drives electromagnetic A. C. error detector 24 which in turn generates a signal proportional to the error between shaft 3 and shaft 11, which signal is used as in Fig. 1 to control the power supplied to torque motor 8. Transformer 26 supplies a bias voltage to amplifier 28, depending upon the setting of bias adjustment resistor 27.

The device shown in Fig. 2 may be used either to check a worm and gear combination or to lap such a combination. If it is desired to lap a worm and pinion combination, the appropriate idler gear 19 is chosen so that the gear ratio attained through gears 18, 19, 23, 21 and 22 matches that furnished by the worm and gear to be checked, and a single revolution of the worm gear is produced by rotation of the worm. Error meter 29 is read continuously throughout this first revolution of worm gear 5, and the extreme reading and the gear location thereof is noted. This extreme reading indicates the maximum error of the gear. Bias adjustment resistor 27 is then adjusted so that error meter 29 reads zero error at the gear location where a maximum error meter reading was observed, and lapping of the gear and pinion is then undertaken in the manner described in connection with Fig. 1. After one set of gears is lapped to the extreme precision desired, the precision roller and drum drive may be replaced by the precision worm and gear attained. Gears lapped with the resultant device will have a precision practically equal to the precision of the said substituted gears. Alternatively, if other methods for obtaining a single set of precision gears are available, any set of precision gears having an accuracy equal to or greater than that desired in the gear being lapped may be substituted in place of the precision rollers of the device.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for lapping a worm and gear combination comprising means for rotating said worm, a first precision ground friction roller coaxially attached to said gear, lapping compound applied to the meshing surfaces of said worm and said gear, a second precision ground friction roller driven by said first roller, a shaft, a precision gear train driven by said second roller for rotating said shaft at the same average rate as said worm, a torque motor connected to produce retarding torque on said gear, differential means for detecting the difference in rotation between said shaft and said worm, and electrical controller means responsive to said difference in angular rotation between said shaft and said worm for controlling the torque in said torque motor to thereby lap those parts of said gear which produce said difference in rotation.

2. A device as recited in claim 1 in which said electrical controller means comprises an electrical error detector and an amplifier for driving said motor.

3. A device as recited in claim 1 and further comprising an electrical meter connected to measure power input to said torque motor to thereby indicate the error present in said worm and gear combination.

4. Means for lapping a worm and gear combination comprising means for rotating said worm at constant angular velocity, means having an output in electrical form for comparing the resultant rotation of said gear with the rotation of said worm, and means, including a torque motor and a controller therefor, responsive to said comparing means for applying a retarding torque to said gear by an amount proportional to the output of said comparing means to thereby cause said worm and gear to be lapped without appreciable error.

5. A device as recited in claim 4 in which said means for comparing comprises a precision ground friction drum attached to said gear, a precision ground friction roller driven by said drum, an electrical angular error detector, a precision gear train connecting said roller and one element of said detector, the other element of said detector being attached to said worm, a torque motor for applying retarding torque to said gear, and an amplifier for driving said torque motor in response to the signal from said detector.

6. A device as recited in claim 4 in which said means for comparing comprises a gear train having at least as great a precision as is required of the lapped gear and attached to said gear, an angular pickoff for detecting angular error between the output rotation of said train of gears and said worm, a torque motor for retarding the rotation of said gear, and amplifier means responsive to said angular pickoff for loading said gear in response to said detected error to thereby lap said worm and gear to the accuracy of said gear train.

7. Means for lapping a worm and gear combination comprising means for rotating said worm at constant angular velocity while drivingly engaging said gear, precision means for comparing the rotation of said worm and the rotation of said gear, means responsive to said comparing means for generating an electrical quantity proportional to the difference between said rotations, means responsive to said comparing means for applying a retarding torque to said gear and electrical biasing means interconnected between said comparing means and said torque means whereby said retarding torque is proportional to said difference between rotations and is zero at the lowest error portion of said gear.

8. The method of lapping a worm and gear combination comprising meshing said gear and worm in driving relationship, covering said worm and gear teeth with lapping compound, rotating said worm at uniform angular velocity, comparing continuously the angular rotation of said worm and said gear, and applying a retarding torque to said gear which varies continuously with the difference between the rotations of said worm and said gear to thereby lap said worm and gear the most at the places where the greatest error appears.

9. Means for measuring the accuracy of a worm in mesh with a gear comprising means for rotating said worm, a pair of precision mechanical drives, one driven directly by said worm and the other driven by said gear, angular error detector means comprising a precision ground friction drum attached to said gear, a precision ground friction roller driven by said drum, an electrical angular error detector, a precision gear train connecting said roller and one element of said detector, and a meter responsive to said electrical error detector, the other element of said detector being attached to said worm whereby said meter indicates the error in said gear.

DOYLE E. WILCOX.

References Cited in the file of this patent

UNITED STATES PATENTS

| Number | Name | Date |
|---|---|---|
| 1,374,698 | Wilkinson | Apr. 12, 1921 |
| 2,060,803 | Falk | Nov. 17, 1936 |
| 2,415,801 | Armitage et al. | Feb. 11, 1947 |
| 2,476,851 | Folsom | July 19, 1949 |

FOREIGN PATENTS

| Number | Country | Date |
|---|---|---|
| 697,586 | Germany | Oct. 17, 1940 |
| 597,013 | Great Britain | Jan. 15, 1948 |